May 17, 1966

J. J. HENNEN 3,251,631

DISCHARGE SPOUT CONTROL

Filed April 15, 1965

INVENTOR.
JOHN J. HENNEN

BY John M. Nolan

ATTORNEY

May 17, 1966     J. J. HENNEN     3,251,631

DISCHARGE SPOUT CONTROL

Filed April 15, 1965     2 Sheets-Sheet 2

INVENTOR.
JOHN J. HENNEN

BY *John M. Nolan*

ATTORNEY

United States Patent Office 3,251,631
Patented May 17, 1966

3,251,631
DISCHARGE SPOUT CONTROL
John J. Hennen, Ottumwa, Iowa, assignor to Deere & Company, Moline, Ill., a corporation of Delaware
Filed Apr. 15, 1965, Ser. No. 448,332
7 Claims. (Cl. 302—34)

This invention relates to a crop handling machine and more particularly to a control for establishing the position of a discharge spout on such a machine and also the position of a deflector cap on the discharge spout.

The invention will be described for use on a conventional forage harvester, which cuts and chops the crop as it advances over the field and delivers the commuted crop through a discharge spout to a collecting vehicle, such as a wagon or a truck. The discharge spout is generally arcuate and is approximately upright at its intake end. The discharge end is approximately horizontal and carries an adjustable deflector cap for directing the crop downwardly into the collecting vehicle.

The discharge spout is conventionally swingable about the vertical axis of its inlet for directing the crop in any desired horizontal direction, and the deflector cap is swingable about a horizontal pivot to direct the crop downwardly at a variable angle from the horizontal. Thus, the collector vehicle can be located at various positions relative to the machine, and for any given vehicle position, the flow direction of the material can be varied to fill the vehicle to a uniform depth.

Selective and relative positioning of both the discharge spout and the deflector cap conventionally employs control means accessible to the operator of the draft vehicle and combining the spout and deflector cap controls by such means as an axially shiftable rearwardly extending shaft rotatable in one axial position to swivel the spout and rotatable in the other position to change the position of the cap. Such mechanisms generally use clutch members which engage in the alternate positions, creating a problem in meshing the clutch members. In addition, since the operator rotates the shaft in both positions, there is a possibility of operator confusion.

According to the present invention, the position of the discharge spout is established by rotating a control shaft, while the position of the deflector cap is established by the axial movement of the same shaft. Thus, two different types of motion are used for the separate functions to eliminate operator confusion as well as to eliminate the necessity for clutch elements.

Accordingly, the general object of the invention is to provide an improved control mechanism for establishing the position of a discharge spout and its deflector cap on a forage harvester or the like, and more particularly to provide a single control mechanism to accomplish both functions.

Another object is to provide such a control mechanism in which the separate functions are performed through different types of movement of the control handle by the operator, and in which the need for clutch elements is eliminated.

Another object is to provide an improved mounting for a discharge spout on a forage harvester or the like.

According to another feature of the invention, the cable or rope, which controls the deflector cap, is located near the axis of rotation of the discharge spout so that rotation of the spout does not affect the position of the deflector cap.

Another object is to provide the rearwardly extending control shaft in such a control mechanism with a universal joint near the discharge spout so that there is a minimum change in the axial position of the shaft when the draft member, which carries the shaft, is shifted.

Still another object is to provide such a control mechanism of simple and rugged construction, inexpensive to manufacture and maintain.

These and other objects of the invention will become apparent from a consideration of the following detailed description and accompanying drawings wherein an embodiment of the invention is illustrated. In the drawings.

Figure 1:
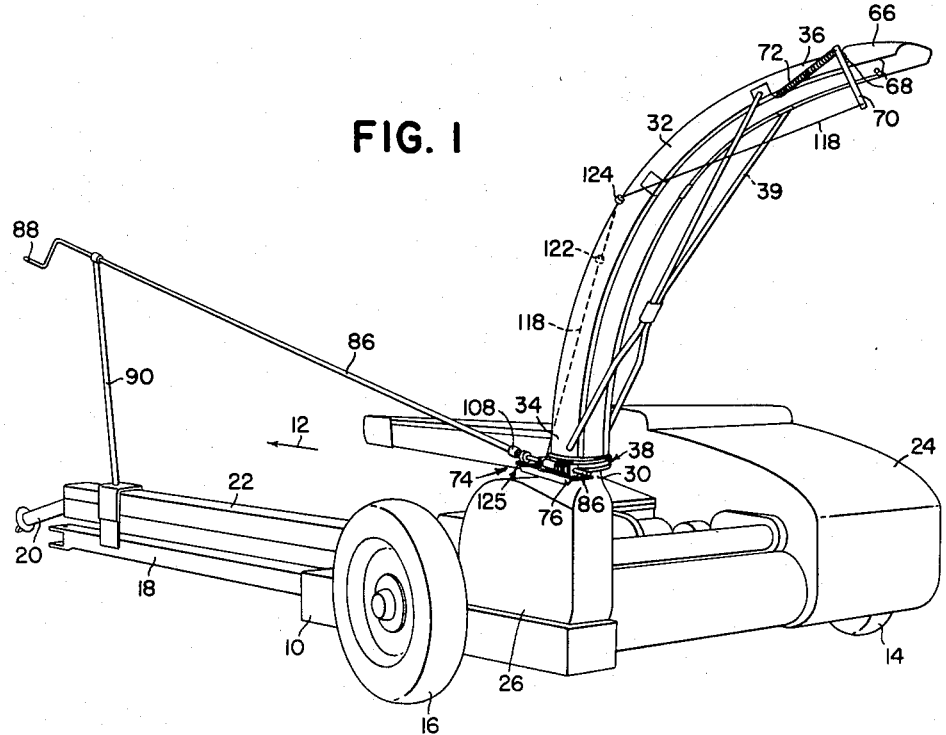
FIG. 1 is a perspective view of a forage harvester including the control mechanism.

The harvester chosen for purpose of illustration includes a frame 10, mounted for advance over a field in the direction of the arrow 12 on right- and left-hand wheels 14 and 16 and is typically pulled by a tractor (not shown) via a draft member 18 over which is carried a drive shaft 20 connectible to the tractor power take-off and shielded at 22.

The harvester chopping mechanism operates within the housing 24 and the commuted crop is discharged tangentially and upwardly by a blower means operating within the blower housing 26, which is rigidly mounted on the frame 10 and has an outlet portion 30 which forms an upwardly directed outlet opening 28.

It is to be understood that such terms as "forwardly," "rearwardly," "upwardly," "downwardly," "horizontal," "vertical," etc., are mere words of convenience used to more clearly describe the invention, and are not to be construed as limiting the orientation or geography of the components.

An arcuate discharge spout 32 has a generally upright inlet end 34, which forms an inlet opening 35, and an approximately horizontal outlet end 36, and is rotatably mounted on the outlet portion 30 via a mounting means 38 (FIG. 4) for swiveling movement about the approximately vertical axis of the inlet end 34. A chord-like support member 39 extends between the inlet end 34 and the outlet end 36 of the discharge spout 32 to strengthen the spout.

Figure 4:
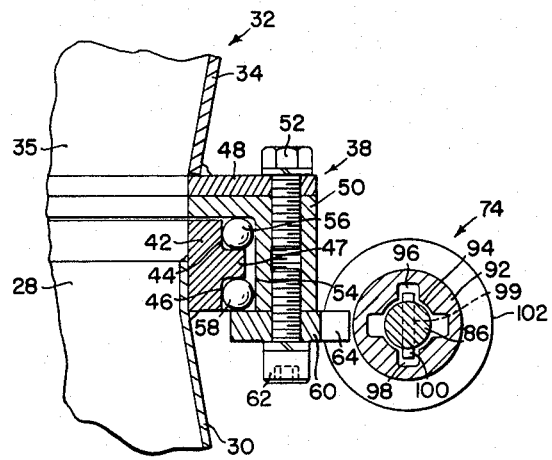
FIG. 4 is a fragmentary section view taken along the line 4—4 of FIG. 2.

As best seen in FIG. 4, the mounting means 38 includes a ring 42, coaxially mounted on the exterior of the blower outlet portion 30 and having bearing races 44 and 46 around its outer periphery and separated by a flange 47. A second ring 48 is coaxially affixed to the outer periphery of the inlet end 34 of the spout 32 and carries a depending annular member 50, which is attached thereto by a plurality of fasteners 52 and which has a bearing race 54 around the inner periphery of the depending portion.

To assemble the mounting means 38, a plurality of ball bearings 56 are placed on the bearing race 44 above the flange 47 around the periphery of the annular ring 42. The ring 50 is lowered around the ring 42 with the bearing race 54 engaging the bearings 56. A second series of bearings 58 is then placed between the races 46 and 54 and retained therein by a ring 60 affixed to the bottom of the annular member 50 by a plurality of fasteners 62.

The outer periphery of the ring 60 forms a gear or worm wheel 64.

A deflector cap 66 is pivotally mounted at the outlet end 36 of the spout 32 for rocking movement about coaxial horizontal pivots 68 on opposite sides of the outlet end. The deflector cap 66 is open toward the bottom and controls the downward deflection of the material as it leaves the outlet end 36 of the spout. The deflector cap includes a depending lever arm 70, and the cap is biased to an approximately horizontal position by a spring means 72.

By establishing the horizontal direction of the outlet end 36 through rotation of the spout 32 and by controlling the vertical deflection of the material as it leaves the spout via the deflector cap, the operator is able to direct the discharge of the crop to a collector vehicle in almost any location proximate to the harvester. The positions of the deflector cap and the discharge spout are controlled by the operator through a single control means, indicated generally by the numeral 74.

The control means includes a support 76 rigidly affixed to the blower housing portion 30. Brackets 78 and 80 are mounted on the support and have axially alined bores 82 and 84 respectively. A generally fore-and-aft extending control shaft 86 is slidably and rotatably carried in said bores and extends forwardly to a crank handle 88 suitably located for manipulation by the operator of the draft vehicle. The forward end of the control shaft is journaled and axially shiftable in a vertical support member 90 mounted at the forward end of the draft member 18.

An elongated cylinder 92, having an axial bore 94 slightly larger than the diameter of the shaft 82, is mounted on the shaft and extends between the brackets 80 and 84. Diametrically opposed radial slots 96 and 98 extend the length of the cylinder, and a diametral pin 100 projects through the shaft and slidably engages the slots 96 and 98, allowing relative axial movement only between the shaft and the cylinder. The pin 100 is inserted into a diametral bore 99 in the shaft 86 by alining said bore 99 with a radial bore 101 in the cylinder and dropping the pin 100 through the bore 101 and pressing it into the bore 99.

The cylinder includes a worm 102 on its outer periphery which meshes with the gear 64. Thus, the pin 100, the cylinder 92, the worm 102, the gear 64 and the mounting means 38 form a connecting means between the shaft 86 and the discharge spout 32, whereby rotation of the shaft rotates the spout 32 about the axis of its inlet end 34.

The shaft 86 rigidly carries thereon a pair of axially spaced radial member 104 and 106 ahead of the bracket 78. The shaft also includes a universal joint 108 immediately ahead of the engaging members. A horizontal lever 110 is pivotally mounted on the support 74 for swinging about a vertical pivot 111. The movement of the lever 110 is resisted by friction means 112 between the lever arm and the support platform, the amount of friction being variable via an adjusting nut 114 on the pivot 111 which provides the normal force on the lever 110.

A pin or lug 116 projects upwardly from the lever 110 and extends between the members 104 and 106 adjacent to the shaft 86, whereby the shaft is free to rotate relative to the lever 110 but axial movement of the shaft swings the lever about its pivot 111. A flexible member 118, such as a rope or cable, is affixed at one end to the lever 110 proximate to the engaging pin and is successively trained through a guide 120 on the bracket 72 and guides 122 and 124 on the discharge spout 32. The other end of the flexible member 118 is attached to the free end of the lever 70. Thus, the flexible member 118, the lever 110, the pin 116 and the engaging members 104 and 106 form a connecting means 125 between the shaft 86 and the deflector cap 66, whereby axial movement of the shaft establishes the position of the deflector cap. The guide 122 is mounted on the spout 32 approximately on the axis of the spout rotation so that rotation of the spout will not change the distance between the guides 120 and 122 to affect the deflector cap position.

The operator can swivel the discharge spout 32 by rotating the shaft 86 via the crank handle 88, thereby rotating the pin 100 and the worm 102, which rotates the spout 32 about the vertical axis of the inlet end 34 through the gear 64. The pin 100 rotates the worm 102 regardless of the axial position of the shaft 86, since the pin slides in the slots 96 and 98. Since the spout is mounted on bearings 56 and 58, it rotates freely, making it adaptable to other types of remote control, such as could be accomplished by a small electric or hydraulic motor.

Figure 2:
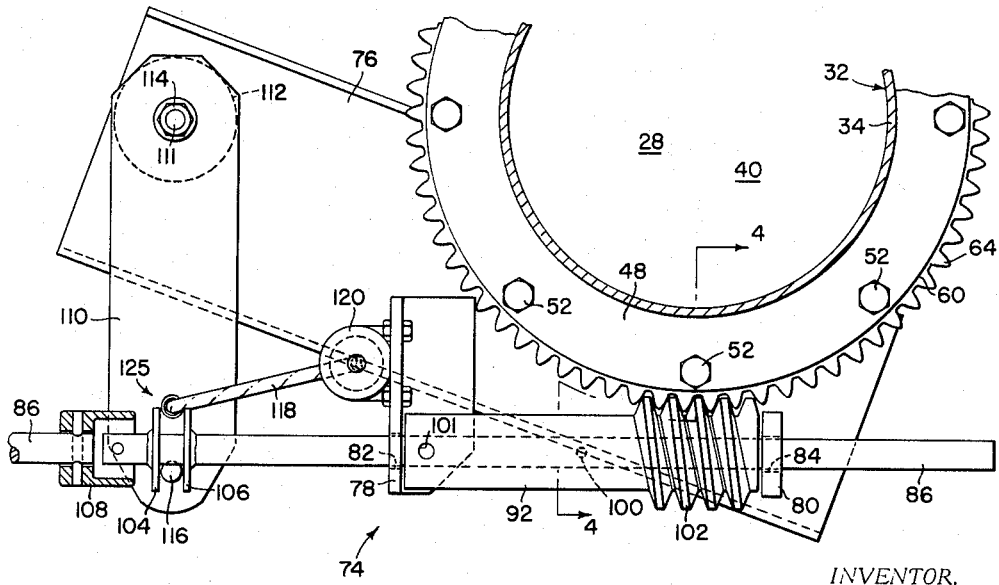
FIG. 2 is an enlarged plan view of the control mechanism, partly in section and omitting the forward portion of the control shaft.
Figure 3:
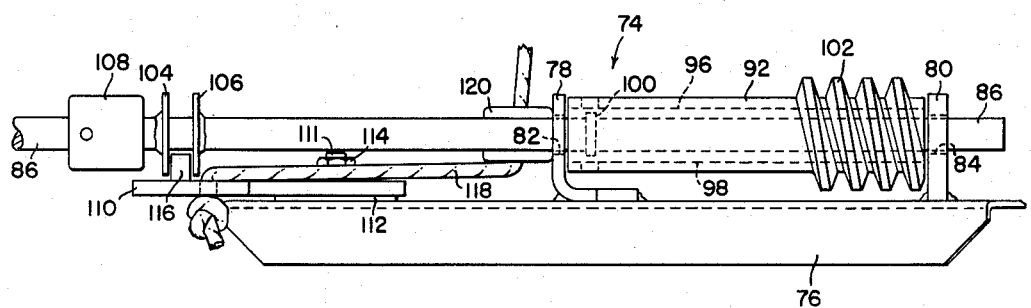
FIG. 3 is an elevation view of the control mechanism shown in FIG. 2, but with the control shaft axially shifted forwardly to lower the deflector cap.

The operator can adjust the position of the deflector cap 66 by moving the shaft 86 axially. When the shaft is pulled to its forward position, as shown in FIG. 3, the deflector cap 66 is directed downwardly. The friction means 112 maintains the position of the lever 110, and consequently the position of the deflector cap 66, despite the bias of the spring 72. When the shaft 86 is moved rearwardly, as shown in FIG. 2, the pin 100 slides rearwardly in the slots 96 and 98, and the spring 72 takes up the slack in the flexible member 118 and raises the deflector cap 66. When the shaft is in its rearward position, the deflector cap extends in the same generally horizontal direction as the outlet end 36 of the discharge spout, as shown in FIG. 1, and does not deflect the crop as it leaves the discharge spout.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a crop handling machine of the type having a frame, a housing mounted on the frame and having an upwardly directed material outlet, and a discharge member including a downwardly directed inlet communicating with the outlet and mounted for rotation on the housing about the axis of said inlet and outlet, said discharge member having an outlet pivotally carrying a deflector member, control means for changing the positions of the members relative to each other and to the housing comprising: a shaft; means operably journaling said shaft on the frame for rotation and axial shifting; and connecting means interconnecting said shaft to said members for moving one of said members by only rotation of said shaft and for moving the other member by only axial movement of said shaft.

2. In a crop handling machine of the type having a frame, a housing mounted on the frame and having a material outlet, and a discharge member including a downwardly directed inlet communicating with the outlet and mounted for rotation on the housing about the axis of said inlet and outlet, said discharge member having an outlet pivotally carrying a deflector member, control means for changing the positions of the members relative to each other and to the housing comprising: a shaft; means operably journaling said shaft on the frame for rotation and axial shifting; a first connecting means operably interconnecting the shaft and the deflector member for moving the deflector member about its pivot in response to axial movement of the shaft; and a second connecting means operably interconnecting the shaft and the discharge member for rotating the discharge member on the housing about its inlet axis in response to rotation of the shaft.

3. The invention defined in claim 2 wherein the first connecting means includes a flexible member having one end operably connected to the deflector member and the other end operably connected to the shaft.

4. The invention defined in claim 2 wherein the second connecting means includes a gear means mounted on said shaft for rotation therewith, said shaft being axially slidable relative to the gear means, and a second gear means mounted on the discharge member and operably engaging the first gear means for rotation of the discharge member in response to rotation of the shaft.

5. In a crop handling machine of the type having a frame, a housing mounted on the frame and having a material outlet, and an arcuate discharge member having a downwardly directed inlet communicating with the outlet and rotatably mounted on the housing for swiveling about the inlet axis, said discharge member having an outlet pivotally carrying a deflector member, control means for changing the positions of the discharge member and the deflector member comprising: an elongated shaft; means operably journaling the shaft on the frame for rotation and axial shifting; a flexible member having one end operably connected to the deflector member and the other end operably connected to the shaft so that the position of said deflector member is responsive to the axial position of the shaft; a gear means mounted on the shaft for rotation therewith, said shaft being axially slidable relative to the gear means; and a second gear means mounted on the discharge member and operably engageable with the first gear means for rotating the discharge member on the housing in response to rotation only of said shaft.

6. In a crop handling machine of the type having a frame, a housing mounted on the frame and having a material outlet, and an arcuate discharge member having a downwardly directed inlet rotatably mounted on the housing in communication with the housing outlet for swiveling about the inlet axis, said discharge member pivotally carrying a deflector member at its outlet end and including spring means for biasing the deflector member toward an undeflecting position, control means for establishing the shifting of the discharge member and the deflector member comprising: an elongated shaft operably journaled on the frame and axially shiftable thereon between first and second positions; a flexible member having one end operably connected to the deflector member and the other end operably connected to the shaft for shifting the deflector member in response to axial shifting of the shaft, the deflector member being in an undeflecting position when the shaft is in its first axial position and moving to a deflecting position against the bias of the spring means as the shaft moves toward its second position; friction means operably connected to the shaft for maintaining the axial position of the shaft until it is manually moved; gear means mounted on the shaft for rotation therewith, said shaft being axially slidable relative to the gear means; and a second gear means mounted on the discharge member and operably meshing with the first gear means for rotating the discharge member on its mounting in response to rotation only of said shaft.

7. The invention defined in claim 6 wherein the flexible member is connected to the shaft via a lever arm pivotally mounted on the frame, and engaging the shaft for swinging in a horizontal arc in response to axial movement only of said shaft, the flexible member being connected to the lever arm and offset from said lever arm pivot, and wherein the friction means is mounted between the frame and the lever arm to maintain the axial position of said lever arm until the shaft is manually moved axially.

References Cited by the Examiner
UNITED STATES PATENTS

| 601,356 | 3/1898 | Russell | 302—8 |
| 702,766 | 6/1902 | Bartholomew | 302—8 |
| 2,916,330 | 12/1959 | Dumanowski | 302—34 |

EVON C. BLUNK, *Primary Examiner.*

A. L. LEVINE, *Assistant Examiner.*